US009366168B2

(12) United States Patent
Matsumoto et al.

(10) Patent No.: US 9,366,168 B2
(45) Date of Patent: Jun. 14, 2016

(54) DETERIORATION DETERMINATION SYSTEM OF EXHAUST EMISSION CONTROL DEVICE

(71) Applicants: Arifumi Matsumoto, Gotenba (JP); Toru Kidokoro, Hadano (JP); Taiga Hagimoto, Shizuoka-ken (JP); Kazuya Takaoka, Susono (JP); Hirokazu Nishijima, Susono (JP); Yuki Terui, Susono (JP); Akifumi Uozumi, Susono (JP)

(72) Inventors: Arifumi Matsumoto, Gotenba (JP); Toru Kidokoro, Hadano (JP); Taiga Hagimoto, Shizuoka-ken (JP); Kazuya Takaoka, Susono (JP); Hirokazu Nishijima, Susono (JP); Yuki Terui, Susono (JP); Akifumi Uozumi, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/648,765

(22) PCT Filed: Oct. 29, 2013

(86) PCT No.: PCT/JP2013/079269
§ 371 (c)(1),
(2) Date: Jun. 1, 2015

(87) PCT Pub. No.: WO2014/087763
PCT Pub. Date: Jun. 12, 2014

(65) Prior Publication Data
US 2015/0315946 A1   Nov. 5, 2015

(30) Foreign Application Priority Data

Dec. 3, 2012   (JP) ................................. 2012-264037

(51) Int. Cl.
*F01N 3/00*   (2006.01)
*F01N 3/20*   (2006.01)
(Continued)

(52) U.S. Cl.
CPC ................ *F01N 3/208* (2013.01); *B01D 53/86* (2013.01); *B01D 53/94* (2013.01);
(Continued)

(58) Field of Classification Search
USPC ............ 60/276, 277, 286, 295, 297, 301, 303
See application file for complete search history.

(56) References Cited

U.S. PATENT DOCUMENTS 8,516,798 B2 *   8/2013   Dobson .................... F01N 3/035
                                               60/286
8,834,821 B2 *   9/2014   Geveci ..................... F01N 3/208
                                               422/105

(Continued)

FOREIGN PATENT DOCUMENTS

JP      2006-9608      1/2006
JP      2009-115032    5/2009

(Continued)

*Primary Examiner* — Binh Q Tran
(74) *Attorney, Agent, or Firm* — Finnegan, Henderson, Farabow, Garrett & Dunner, LLP

(57) ABSTRACT

An object of the present invention is to increase the accuracy of a deterioration determination in a deterioration determination system of an exhaust emission control device having a selective reduction type NOx catalyst, by suppressing false determinations when the deterioration determination is made. The deterioration determination system includes a catalyst having an oxidative capacity downstream of a NOx catalyst using ammonia as a reducing agent. When an amount of ammonia adsorbed by the NOx catalyst is larger than an equilibrium adsorption amount, out of the amount of ammonia flowing into the catalyst having the oxidative capacity, at least one of the amount of ammonia flowing out from the catalyst having the oxidative capacity and the amount of ammonia converted to NOx in the catalyst having the oxidative capacity or a total value of both is calculated. When the value exceeds a threshold, the use of a detection value of an NOx sensor is limited in a deterioration determination or the deterioration determination itself is prohibited.

5 Claims, 8 Drawing Sheets

(51) Int. Cl.
  *B01D 53/94* (2006.01)
  *F01N 11/00* (2006.01)
  *F01N 3/10* (2006.01)
  *F01N 13/00* (2010.01)
  *B01D 53/86* (2006.01)

(52) U.S. Cl.
  CPC ....... B01D 53/9477 (2013.01); B01D 53/9495 (2013.01); F01N 3/106 (2013.01); F01N 11/002 (2013.01); F01N 11/007 (2013.01); F01N 13/0097 (2014.06); *B01D 53/9404* (2013.01); *B01D 2251/2067* (2013.01); *F01N 2550/02* (2013.01); *F01N 2560/026* (2013.01); *F01N 2570/18* (2013.01); *F01N 2610/02* (2013.01); *F01N 2900/1616* (2013.01); *F01N 2900/1622* (2013.01); *Y02T 10/24* (2013.01); *Y02T 10/47* (2013.01)

(56) References Cited

U.S. PATENT DOCUMENTS

| | | | | |
|---|---|---|---|---|
| 8,863,503 | B2 * | 10/2014 | Yasui | ........................ F01N 3/10 60/274 |
| 8,899,024 | B2 * | 12/2014 | Masaki | ................... F01N 3/208 60/286 |
| 9,133,749 | B2 * | 9/2015 | Gady | ....................... F01N 3/103 |
| 2009/0120073 | A1 | 5/2009 | Fujita et al. | |
| 2011/0236280 | A1 | 9/2011 | Gotan et al. | |

FOREIGN PATENT DOCUMENTS

JP  2009-156159  7/2009
JP  2011-196309  10/2011

* cited by examiner

DETERIORATION DETERMINATION SYSTEM OF EXHAUST EMISSION CONTROL DEVICE

CROSS-REFERENCE TO RELATED APPLICATIONS

This application is a national phase application of International Application No. PCT/JP2013/079269, filed Oct. 29, 2013, and claims the priority of Japanese Application No. 2012-264037, filed Dec. 3, 2012, the content of both of which is incorporated herein by reference.

TECHNICAL FIELD

The present invention relates to a deterioration determination system of an exhaust emission control device.

BACKGROUND ART

An exhaust emission control device having a selective reduction type NOx catalyst (hereinafter, referred to simply as an "NOx catalyst") to remove NOx contained in an exhaust gas discharged from an internal combustion engine by using ammonia as a reducing agent is known. A supply valve or the like that supplies ammonia or a precursor of ammonia (for example, urea) into an exhaust gas upstream of the NOx catalyst is installed in the exhaust emission control device so that an adsorption amount of ammonia by the NOx catalyst is appropriate for NOx removal.

Even if the NOx catalyst is normal, however, the amount of ammonia that can be adsorbed by the NOx catalyst decreases due to a temperature rise of the NOx catalyst so that ammonia may flow out from the NOx catalyst. On the other hand, purifying ammonia flowing out from the NOx catalyst by arranging an oxidation catalyst downstream of the NOx catalyst is known. Then, a technology to determine abnormal conditions of the NOx catalyst or the oxidation catalyst based on a value of an NOx sensor downstream of the oxidation catalyst when the oxidation catalyst is arranged downstream of the NOx catalyst and the amount of urea supplied to the NOx catalyst is increased is known (see, for example, Patent Literature 1). Also, the conversion of ammonia to NO in an ammonia slip catalyst provided downstream of the NOx catalyst is known (see, for example, Patent Literature 2). In addition, the conversion of ammonia to NO in the ammonia slip catalyst provided downstream of the NOx catalyst at 400° C. or higher is known (see, for example, Patent Literature 3). Further, it is known that, when the conversion of ammonia to NO occurs in a sensor cell of the NOx sensor, the sensor output increases (see, for example, Patent Literature 4).

When the temperature of the NOx catalyst rises, ammonia may be released from the NOx catalyst. Such a release of ammonia may occur also in a normal NOx catalyst and the release itself is not an abnormal condition of the NOx catalyst. Also, depending on the temperature of the NOx catalyst, the temperature of the oxidation catalyst, and the flow rate of exhaust gas, ammonia flowing out from the NOx catalyst may not be oxidized by the oxidation catalyst or ammonia flowing out from the NOx catalyst may be converted to NOx even if the oxidation catalyst is normal. Therefore, even if the NOx catalyst and the oxidation catalyst are normal, ammonia may flow out downstream of the oxidation catalyst or NOx converted from ammonia may flow out.

Incidentally, the NOx sensor also detects ammonia and when the NOx sensor is installed downstream of the oxidation catalyst, NOx and ammonia flowing out from the oxidation catalyst are detected. Thus, if the NOx removal rate is calculated based on the NOx concentration upstream of the NOx catalyst and the NOx concentration downstream of the oxidation catalyst, the NOx removal rate is calculated lower due to ammonia and NOx flowing out from the oxidation catalyst with a rising temperature of the NOx catalyst. Then, if the deterioration of an exhaust emission control device is determined based on the NOx removal rate, there is the possibility that the exhaust emission control device is determined to have deteriorated even if the NOx catalyst and the oxidation catalyst are normal.

PRIOR ART REFERENCES

Patent Documents

Patent Literature 1: Japanese Patent Application Publication No. 2009-156159
Patent Literature 2: Japanese Patent Application Publication No. 2006-009608
Patent Literature 3: Japanese Patent Application Publication No. 2011-196309
Patent Literature 4: Japanese Patent Application Publication No. 2009-115032

SUMMARY OF THE INVENTION

Problems to be Solved by the Invention

The present invention is made in view of the above problem and an object thereof is to increase the accuracy of a deterioration determination in a deterioration determination system of an exhaust emission control device having a selective reduction type NOx catalyst by suppressing false determinations when the deterioration determination is made.

Means for Solving the Problems

To solve the above problem, the present invention is a deterioration determination system of an exhaust emission control device having:
a selective reduction type NOx catalyst provided in an exhaust path of an internal combustion engine and using ammonia as a reducing agent;
a reducing agent supply unit that supplies ammonia or a precursor of the ammonia into an exhaust gas flowing into the selective reduction type NOx catalyst upstream of the selective reduction type NOx catalyst;
a catalyst provided downstream of the selective reduction type NOx catalyst and having an oxidative capacity;
an NOx sensor provided downstream of the catalyst having the oxidative capacity to detect NOx in the exhaust gas flowing out from the catalyst having the oxidative capacity and also to detect the ammonia in the exhaust gas as NOx; and
a deterioration determination unit that makes a deterioration determination of the selective reduction type NOx catalyst based on a detection value of the NOx sensor,
the deterioration determination system including:
an outflow amount calculation unit that calculates, when an amount of the ammonia adsorbed by the selective reduction type NOx catalyst is larger than an equilibrium adsorption amount which is an adsorption amount of the ammonia when adsorption and release of the ammonia by and from the selective reduction type NOx catalyst are in an equilibrium state, out of the amount of the ammonia flowing into the catalyst having the oxidative capacity, at least one of the amount of the ammonia flowing out from the catalyst having the oxidative capacity and the amount of the ammonia converted to NOx in the catalyst having the oxidative capacity or a total value of both; and a deterioration determination limiting unit that, when the value calculated by the outflow amount calculation unit exceeds a threshold, limits use of the detection value of the NOx sensor in the deterioration determination by the deterioration determination unit, or prohibits the deterioration determination itself by the deterioration determination unit.

The deterioration determination unit makes a deterioration determination of the NOx catalyst provided in the exhaust path of an internal combustion engine. The NOx catalyst adsorbs ammonia in an exhaust gas and selectively reduces NOx using ammonia as a reducing agent. Ammonia consumed by the NOx catalyst is ammonia supplied into the exhaust gas by the reducing agent supply unit or a precursor of ammonia (for example, urea). Such supplied ammonia may be supplied into the exhaust gas as an aqueous solution or as a gas.

The NOx sensor to detect NOx in the exhaust gas flowing out from the NOx catalyst is provided downstream of the NOx catalyst. The NOx sensor is a type of NOx sensor subject to so-called interference of ammonia and so, if ammonia is contained in the exhaust gas, the ammonia is also detected as NOx. Therefore, the detection value of the NOx sensor depends on NOx and ammonia contained in the exhaust gas.

In the deterioration determination system of an exhaust emission control device according to the present invention, a deterioration determination of the NOx catalyst is made by the deterioration determination unit using the detection value of the NOx sensor. That is, by using the detection value of the NOx sensor and also the amount of NOx in the exhaust gas flowing into the NOx catalyst as the amount of NOx in the exhaust gas flowing out from the NOx catalyst, for example, the deterioration determination of the NOx catalyst based on the NOx removal rate can be made. In general, when the NOx removal rate of the NOx catalyst falls below a reference value, the catalyst can be determined to have deteriorated.

In the NOx catalyst, the amount of ammonia adsorbed by a catalyst carrier and the amount of ammonia released from the catalyst carrier can constantly change in accordance with the environment (such as the catalyst temperature) in which the NOx catalyst is placed. If the environment in which the NOx catalyst is placed is stable, however, a state in which the amount of ammonia adsorbed by a catalyst carrier and the amount of ammonia released from the catalyst carrier are balanced, that is, an equilibrium state is reached. In the present application, the adsorption amount of ammonia by the NOx catalyst in an equilibrium state regarding the adsorption of ammonia will be referred to as an equilibrium adsorption amount. The NOx catalyst exhibits characteristics (hereinafter, referred to also as "adsorption characteristics") in which the equilibrium adsorption amount decreases with a rising temperature. Even if the NOx catalyst has deteriorated, the adsorption characteristics can be verified though the NOx removal rate of the NOx catalyst is low.

In consideration of the above, the present applicant found the possibility that an NOx catalyst that should be determined to be normal is erroneously determined to have deteriorated (not to be normal) when a deterioration determination using the detection value of the NOx sensor concerning the NOx catalyst is made.

When the temperature of the NOx catalyst is in the process of rising and the temperature change is relatively rapid, there is the possibility of losing the equilibrium state in the NOx catalyst concerning the ammonia adsorption. According to the above adsorption characteristics of the NOx catalyst, if the temperature of the NOx catalyst rises, the release of ammonia from the NOx catalyst does not keep up and a state in which the actual adsorption amount of ammonia is more than the equilibrium adsorption amount corresponding to the temperature of the NOx catalyst arises.

Thus, if the adsorption amount of ammonia becomes excessive due to the temperature rise of the NOx catalyst, an increased amount of ammonia flowing out from the NOx catalyst results. The ammonia may be oxidized by a catalyst having an oxidative capacity, but under certain conditions, the ammonia may pass through the catalyst having the oxidative capacity without being oxidized. In addition, the ammonia may be converted to NOx by the catalyst having the oxidative capacity to flow out from the catalyst having the oxidative capacity in a state of NOx.

The NOx sensor arranged downstream of the catalyst having the oxidative capacity detects ammonia and NOx and thus, the detection value becomes large depending on, as described above, ammonia passing through the catalyst having the oxidative capacity (hereinafter, referred to as "slip ammonia") and ammonia converted to NOx in the catalyst having the oxidative capacity (hereinafter, referred to as "NOx converted ammonia").

Then, if the slip ammonia amount or the NOx converted ammonia amount increases, the NOx removal rate of the NOx catalyst calculated based on the detection value of the NOx sensor apparently falls. Therefore, even if the NOx catalyst is in a state that should be determined to be normal, the NOx catalyst may erroneously be determined to have deteriorated (not to be normal) due to the apparent fall of the NOx removal rate.

In contrast, the deterioration determination limiting unit limits the use of the detection value of the NOx sensor or prohibits the deterioration determination itself to suppress false determinations when at least one of the slip ammonia amount and the NOx converted ammonia amount or a total value of both is equal to or more than a threshold. Limiting the use of the detection value of the NOx sensor includes making a deterioration determination without using the detection value of the NOx sensor and lowering the degree of influence of the detection value on the deterioration determination even if the detection value of the NOx sensor is used. The threshold here may be a value when the accuracy of deterioration determination becomes a desired accuracy or the accuracy of deterioration determination is within a permission range. The threshold may also be determined in accordance with laws and regulations.

The slip ammonia amount or the NOx converted ammonia amount is related to the amount of ammonia flowing out from the NOx catalyst and thus can be determined based on the amount of ammonia flowing out from the NOx catalyst. The amount of ammonia flowing out from the NOx catalyst may be the amount of ammonia released from the NOx catalyst when the temperature of the NOx catalyst rises.

Thus, by limiting the use of the detection value of the NOx sensor when a deterioration determination is made by the deterioration determination unit or prohibiting the deterioration determination itself by the deterioration determination unit, it is possible to prevent the NOx catalyst from being determined to have deteriorated in spite of its normal operation. Therefore, the accuracy of deterioration determination of the NOx catalyst can be improved.

Also in the present invention, the outflow amount calculation unit can calculate, out of the amount of the ammonia flowing into the catalyst having the oxidative capacity, at least one of the amount of the ammonia flowing out from the catalyst having the oxidative capacity and the amount of the ammonia converted to NOx in the catalyst having the oxidative capacity or a total value of both, based on a temperature of the catalyst having the oxidative capacity and an amount of intake air of the internal combustion engine.

The degree of the ammonia being oxidized is related to the temperature of the catalyst having the oxidative capacity and the flow rate of an exhaust gas passing through the catalyst having the oxidative capacity. Thus, the ratio of the slip ammonia amount to the amount of ammonia flowing into the catalyst having the oxidative capacity and the ratio of the NOx converted ammonia amount to the amount of ammonia flowing into the catalyst having the oxidative capacity are related to the temperature of the catalyst having the oxidative capacity and an amount of intake air of an internal combustion engine. Incidentally, the amount of intake air of the internal combustion engine is related to the flow rate of the exhaust gas passing through the catalyst having the oxidative capacity. That is, the slip ammonia amount and the NOx converted ammonia amount can be calculated based on the temperature of the catalyst having the oxidative capacity and the amount of intake air of the internal combustion engine.

In the present invention, the deterioration determination unit:

can make the deterioration determination by comparing an NOx removal rate of the selective reduction type NOx catalyst calculated based on the detection value of the NOx sensor and an amount of NOx in the exhaust gas flowing into the selective reduction type NOx catalyst with a determination threshold serving as a threshold to determine deterioration of the selective reduction type NOx catalyst; and can change the determination threshold based on a calculated value by the outflow amount calculation unit when the value calculated by the outflow amount calculation unit is equal to or less than a threshold.

When the value calculated by the outflow amount calculation unit is equal to or less than the threshold, the accuracy of deterioration determination is considered to be high and thus, the use of the detection value of the NOx sensor is not limited in the deterioration determination by the deterioration determination unit and the deterioration determination itself by the deterioration determination unit is not prohibited. Even in such a case, however, slip ammonia or NOx converted ammonia may flow out from the catalyst having the oxidative capacity to be detected by the NOx sensor. Though the amount of change of the detection value of the NOx sensor in this case is small, if the determination threshold is changed in accordance with the amount of change, the accuracy of deterioration determination can further be improved. That is, the detection value of the NOx sensor changes in accordance with the slip ammonia amount or the NOx converted ammonia amount and thus, the influence of the slip ammonia amount or the NOx converted ammonia amount can be reduced by changing the determination threshold based on a calculated value by the outflow amount calculation unit.

In the present invention, the deterioration determination system can further include an inflow amount calculation unit that calculates, when the equilibrium adsorption amount decreases with a rising temperature of the selective reduction type NOx catalyst, the amount of the ammonia flowing into the catalyst having the oxidative capacity, based on at least an excessive adsorption amount which is a difference between an actual adsorption amount of the ammonia by the selective reduction type NOx catalyst and the equilibrium adsorption amount.

The excessive adsorption amount and the amount of NOx released from the NOx catalyst are correlated. If the amount of NOx released from the NOx catalyst is considered to directly flow into the catalyst having the oxidative capacity, the excessive adsorption amount and the amount of ammonia flowing into the catalyst having the oxidative capacity are also correlated. Following these correlations, the inflow amount calculation unit can calculate the amount of ammonia flowing into the catalyst having the oxidative capacity based on the excessive adsorption amount.

In the present invention, the inflow amount calculation unit can further calculate the excessive adsorption amount based on at least one of:

the amount of the ammonia excessively adsorbed by the selective reduction type NOx catalyst caused by an excessive reducing agent of the reducing agent supplied from the reducing agent supply unit;

the amount of the ammonia consumed more than that in the equilibrium state for NOx reduction by the selective reduction type NOx catalyst resulting from adsorption of ammonia in an amount greater than the equilibrium adsorption amount by the selective reduction type NOx catalyst; and the value calculated by the inflow amount calculation unit.

Ammonia excessively adsorbed by the NOx catalyst is excessive ammonia for ammonia necessary for reduction of NOx. For example, more ammonia than the amount of ammonia necessary for reduction of NOx may be supplied for the purpose of cooling the reducing agent supply unit. Even in such a case, more ammonia can be adsorbed by the NOx catalyst than in an equilibrium state. Then, the amount of ammonia excessively adsorbed by the NOx catalyst acts in a direction to increase the excessive adsorption amount.

With an increasing amount of ammonia adsorbed by the NOx catalyst, it becomes easier to reduce NOx and thus, the consumption of ammonia increases. This also applies when more ammonia than in an equilibrium state is adsorbed. Thus, when more ammonia than in an equilibrium state is adsorbed, the consumption of ammonia increases when compared with the equilibrium state. Then, the amount of ammonia consumed more than that in the equilibrium state acts in a direction to decrease the excessive adsorption amount.

The value calculated by the inflow amount calculation unit can be considered to be the amount of ammonia flowing out from the NOx catalyst. Then, the release amount of ammonia from the NOx catalyst changes in accordance with the amount of ammonia adsorbed by the NOx catalyst. That is, with an increasing amount of ammonia adsorbed by the NOx catalyst, it is easier for ammonia to be released and thus, the release amount of ammonia increases. On the other hand, also the amount of ammonia adsorbed by the NOx catalyst changes in accordance with the release amount of ammonia from the NOx catalyst. That is, with an increasing release amount of ammonia from the NOx catalyst, the amount of ammonia adsorbed by the NOx catalyst decreases and thus, the excessive adsorption amount decreases. Therefore, the amount of ammonia adsorbed by the NOx catalyst and the amount of ammonia released from the NOx catalyst affect each other. Then, the value calculated by the inflow amount calculation unit, that is, the amount of ammonia released from the NOx catalyst acts in a direction to decrease the excessive adsorption amount.

As described above, the amount of ammonia flowing out from the NOx catalyst changes depending on the amount of ammonia excessively adsorbed by the NOx catalyst, more ammonia consumption than in an equilibrium state, and the value calculated by the inflow amount calculation unit and thus, the slip ammonia amount and the NOx converted ammonia amount may also change. Therefore, the accuracy of deterioration determination can be improved by calculating the excessive adsorption amount in consideration of the amount of ammonia excessively adsorbed by the NOx catalyst, more ammonia consumption than in an equilibrium state, and the value calculated by the inflow amount calculation unit.

Incidentally, more ammonia consumption than in an equilibrium state may be set to 0. When the NOx catalyst is normal, the NOx removal rate in an equilibrium state regarding the adsorption of ammonia is substantially 1000. Thus, the NOx removal rate is 1000 and hardly changes even in a state in which more ammonia than in an equilibrium state is adsorbed. Therefore, ammonia consumption hardly changes. Hence, ammonia consumption increased from the equilibrium state can be considered to be 0.

Effect of the Invention

According to the present invention, the accuracy of a deterioration determination in a deterioration determination system having a selective reduction type NOx catalyst can be increased by suppressing false determinations when the deterioration determination is made.

MODES FOR CARRYING OUT THE INVENTION

Figure 1:
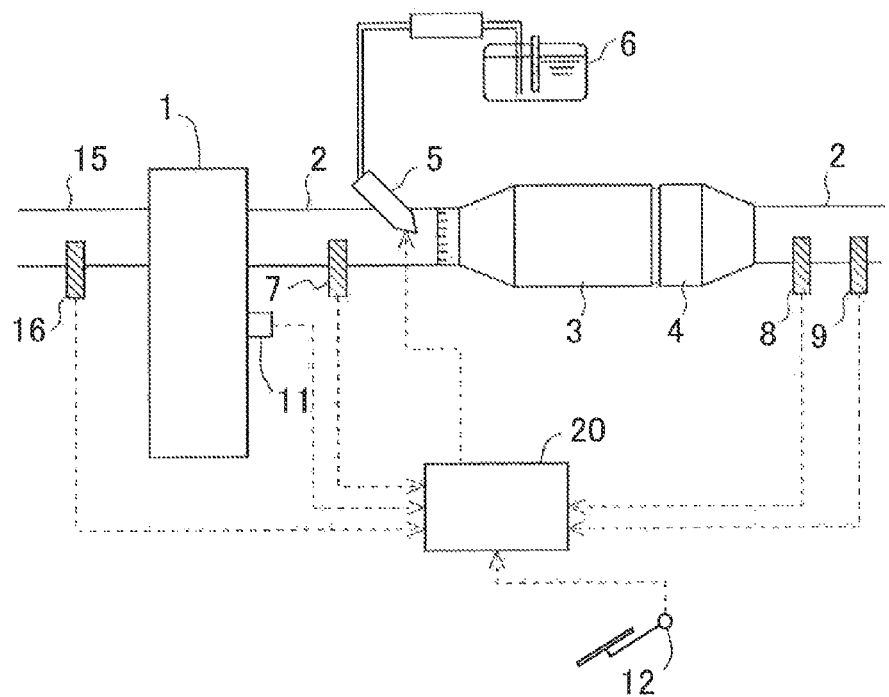
FIG. 1 is a diagram showing an outline configuration of an intake system and an exhaust system of an internal combustion engine according to an example.

Hereinafter, modes for carrying out the present invention will exemplarily be described in detail based on examples by referring to the drawings. However, if not specifically described, dimensions, materials, shapes, and their relative arrangements of components described in the examples are not intended to limit the scope of the present invention to such examples.

Example 1

FIG. 1 is a diagram showing an outline configuration of an intake system and an exhaust system of an internal combustion engine according to the present example. An internal combustion engine 1 is a diesel engine for driving vehicles. An exhaust path 2 is connected to the internal combustion engine 1. In the exhaust path 2, a selective reduction type NOx catalyst 3 (hereinafter, referred to as an "NOx catalyst 3") that selectively reduces NOx in an exhaust gas by using ammonia as a reducing agent and further, an oxidation catalyst 4 (hereinafter, referred to as an "ASC catalyst 4") to oxidize ammonia slipping from the NOx catalyst 3 is provided downstream of the NOx catalyst 3. In the present example, the ASC catalyst 4 corresponds to a catalyst having an oxidative capacity in the present invention. The ASC catalyst 4 only needs to have the oxidative capacity and may be another catalyst such as a three-way catalyst.

To generate ammonia acting as a reducing agent in the NOx catalyst 3, urea water stored in a urea tank 6 is added to an exhaust gas through a supply valve 5. The supply valve 5 in the present example corresponds to a reducing agent supply unit in the present invention. In addition, a particulate filter to capture PM in the exhaust gas may be provided upstream of the NOx catalyst 3 and further, an oxidation catalyst to oxidize a predetermined component (unburnt fuel, CO and the like) in the exhaust gas may be provided upstream thereof.

Further, an NOx sensor 7 to detect NOx in the exhaust gas flowing into the NOx catalyst 3 is provided upstream of the NOx catalyst 3 and an NOx sensor 8 to detect NOx in the exhaust gas flowing out from the NOx catalyst 3 and a temperature sensor 9 to detect the exhaust gas temperature are provided downstream of the NOx catalyst 3.

On the other hand, an intake path 15 is connected to the internal combustion engine 1. An air flow meter 16 to detect the flow rate of the intake is provided in the intake path 15.

Then, the internal combustion engine 1 is provided with an electronic control unit (ECU) 20. The ECU 20 is a unit that controls an operating state of the internal combustion engine 1, the exhaust emission control device and the like. In addition to the NOx sensor 7, the NOx sensor 8, the temperature sensor 9, and the air flow meter 16, a crank position sensor 11 and an accelerator opening sensor 12 are electrically connected to the ECU 20 and detection values of each sensor are delivered to the ECU 20.

Therefore, the ECU 20 can grasp the engine speed based on detection by the crank position sensor 11 and the operating state of the internal combustion engine 1 such as engine loads based on detection by the accelerator opening sensor 12. In the present example, while NOx in the exhaust gas flowing into the NOx catalyst 3 can be detected by the NOx sensor 7, NOx contained in the exhaust gas discharged from the internal combustion engine 1 (the exhaust gas before being purified by the NOx catalyst 3 and so is the exhaust gas flowing into the NOx catalyst 3) is related to the operating state of the internal combustion engine and thus can also be estimated based on the operating state of the internal combustion engine 1. The ECU 20 can estimate the temperatures of the NOx catalyst 3 and the ASC catalyst 4 based on the exhaust gas temperature detected by the temperature sensor 9 or a temperature sensor provided upstream of the NOx catalyst 3. In addition, the ECU 20 can estimate the flow rate of exhaust gas based on the amount of intake air detected by the air flow meter 16.

Then, the ECU 20 gives instructions to the supply valve 5 in accordance with the NOx concentration (or the amount of NOx) detected or estimated in the exhaust gas so that urea water in the amount necessary for reduction removal of NOx is supplied into the exhaust gas. When the NOx catalyst 3 is not in an active state, NOx removal cannot be performed effectively using the supplied urea water and therefore, the urea water is supplied from the supply valve 5 only when the estimated temperature of the NOx catalyst 3 is equal to or higher than a predetermined temperature at which the catalyst is active.

Here, the deterioration determination of the NOx catalyst 3 will be described. In the deterioration determination of the NOx catalyst 3, when the NOx removal rate by the NOx catalyst 3 falls below a predetermined threshold (determination threshold), the NOx catalyst 3 is determined to have insufficient reduction capabilities and therefore, to be in a deteriorated state. In the present example, the ECU 20 that makes a deterioration determination of the NOx catalyst 3 corresponds to a deterioration determination unit in the present invention. The NOx removal rate by the NOx catalyst 3 is a ratio of the amount of NOx removed by the NOx catalyst 3 to the amount of NOx flowing into the NOx catalyst 3 and can be represented by the following formula:

NOx removal rate=1−(detection value of the NOx sensor 8)/(detection value of the NOx sensor 7). (Formula 1)

The NOx sensor 7 and the NOx sensor 8 are subject to interference of ammonia. Thus, if the exhaust gas flowing into a detection unit of each of the NOx sensors 7, 8 contains ammonia molecules, the detection unit detects such ammonia molecules as NOx. In consideration of the above circumstances, the NOx sensor 7 is arranged upstream of the supply valve 5 so spaced therefrom as not to be affected by urea water supplied into the exhaust gas from the supply valve 5.

On the other hand, the NOx sensor 8 is affected by ammonia generated by urea water supplied from the supply valve 5 and not oxidation-removed by the ASC catalyst 4 without being subjected to a selective reduction reaction by the NOx catalyst 3 (hereinafter, referred to as "slip ammonia"). The NOx sensor 8 is also affected by ammonia (hereinafter, referred to as "NOx converted ammonia") generated by urea water supplied from the supply valve 5 and converted to NOx after being oxidized by the ASC catalyst 4 without being subjected to a selective reduction reaction by the NOx catalyst 3.

In view of the above points, an apparent NOx removal rate calculated based on detection values of the NOx sensor 7 and the NOx sensor 8 is lower than the actual NOx removal rate of the NOx catalyst 3 by a portion of slip ammonia and NOx converted ammonia. That is, the apparent NOx removal rate is lower by the following portion:

Lowered portion of the apparent NOx removal rate= (slip ammonia amount and NOx converted ammonia amount)/(amount of NOx determined from the detection value of the NOx sensor 7). (Formula 2)

In Formula 2, each "amount" may be a "concentration".

Thus, if slip ammonia or NOx converted ammonia arises, the NOx sensor 8 is affected thereby, resulting in an apparently lower NOx removal rate.

The present applicant found a phenomenon in which the slip ammonia amount or the NOx converted ammonia amount temporarily increases in a deterioration determination system of an exhaust emission control device having the above characteristics regarding the NOx removal rate in a specific transient state in which the operating state of the internal combustion engine 1 varies. The NOx removal rate calculated based on the detection value of the NOx sensor 8 is affected by slip ammonia or NOx converted ammonia and thus, if the slip ammonia amount or the NOx converted ammonia amount temporarily increases, the apparent NOx removal rate falls in a specific transient state. As a result, even if the NOx catalyst 3 is normal, the calculated NOx removal rate may fall below the determination threshold. Therefore, the NOx catalyst 3 that should be determined to be normal may be determined to be in a deteriorated state.

Figure 2:
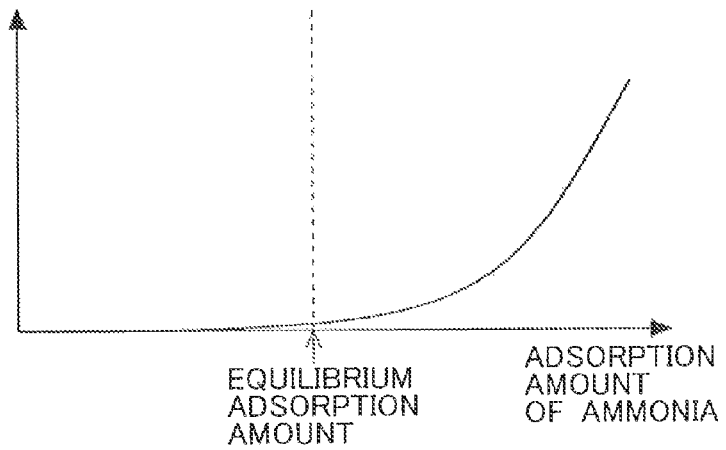
FIG. 2 is a diagram showing the relationship between an adsorption amount of ammonia by an NOx catalyst and an amount of ammonia flowing into an ASC catalyst.

Here, the specific transient state that could invite an erroneous deterioration determination (wrong deterioration determination) will be described based on FIGS. 2 to 4. FIG. 2 is a diagram showing the relationship between an adsorption amount of ammonia by the NOx catalyst 3 and an amount of ammonia flowing into the ASC catalyst 4. In FIG. 2, an "equilibrium adsorption amount" is the adsorption amount of ammonia in an equilibrium state regarding the adsorption of ammonia. The equilibrium state here is a state in which the amount of ammonia adsorbed by a carrier of the NOx catalyst and the amount of adsorbed ammonia released from the carrier are balanced and apparently, the amount of ammonia adsorbed by the carrier is constant. The adsorption of ammonia is dominant in the NOx catalyst 3 when the adsorption amount of ammonia by the NOx catalyst 3 is smaller than the equilibrium adsorption amount and the release of ammonia is dominant in the NOx catalyst 3 when the adsorption amount of ammonia by the NOx catalyst 3 is larger than the equilibrium adsorption amount. If the release of ammonia is dominant in the NOx catalyst 3, the amount of ammonia flowing out from the NOx catalyst 3 increases and thus, the amount of ammonia flowing into the ASC catalyst 4 increases. This phenomenon becomes more pronounced as the adsorption amount of ammonia increases. The equilibrium adsorption amount greatly depends on the temperature of the NOx catalyst 3.

Figure 3:
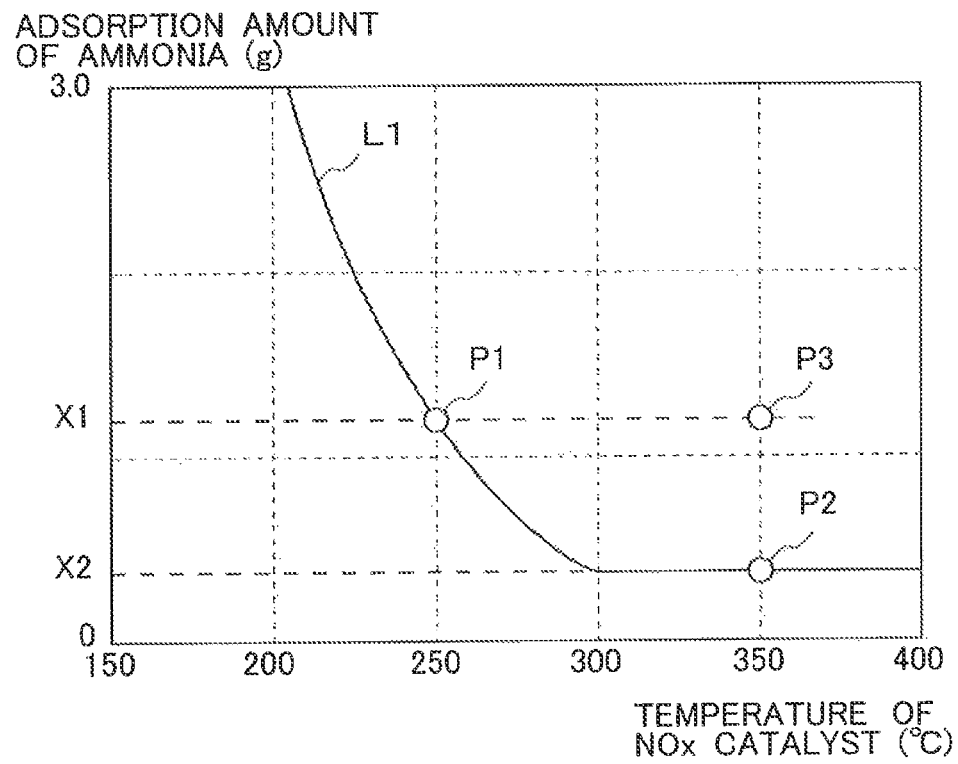
FIG. 3 is a diagram showing the relationship between the temperature of the NOx catalyst and the adsorption amount of ammonia by the NOx catalyst.
Figure 4:
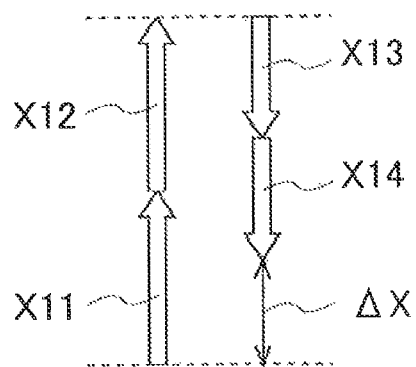
FIG. 4 is a diagram schematically showing the adsorption amount of ammonia by the NOx catalyst, the adsorption state of which reaches point P3 from point P1 due to a rapid rise of the catalyst temperature.

FIG. 3 is a diagram showing the relationship between the temperature of the NOx catalyst 3 and the adsorption amount of ammonia by the NOx catalyst 3. In FIG. 3, a solid line L1 indicates the equilibrium adsorption amount. When the NOx catalyst 3 is normal, the amount of ammonia adsorbed by the NOx catalyst 3 may decrease with a rising temperature of the NOx catalyst.

Here, the adsorption amount of ammonia by the NOx catalyst 3 in an equilibrium state regarding the adsorption of ammonia when the temperature of the NOx catalyst 3 rises will be considered. It is assumed that the NOx catalyst 3 is in an equilibrium state (catalyst temperature: 250° C., ammonia adsorption amount X1) when the catalyst temperature is 250° C. If, in such a case, the catalyst temperature gradually changes from 250° C. to 350° C., the adsorption state of the NOx catalyst 3 defined by the temperature of the NOx catalyst 3 and the adsorption amount of ammonia leads to the equilibrium state when the catalyst temperature is 350° C. (that is, the state represented by point P2 (catalyst temperature: 350° C., ammonia adsorption amount X2)) by going through a locus corresponding to the equilibrium state defined by the solid line L1. In this case, the NOx catalyst 3 is always in an equilibrium state.

If, however, the catalyst temperature rises rapidly from 250° C. to 350° C., the release of ammonia from the NOx catalyst 3 does not keep up and the adsorption state of the NOx catalyst 3 leads to a state significantly deviating from the equilibrium state defined by the solid line L1, that is, to a state represented by point P3 (catalyst temperature: 350° C., ammonia adsorption amount X1). The state represented by this point P3 can be said to be a state (hereinafter, referred to also as an "excessive adsorption state") in which ammonia is excessively adsorbed due to a rapid temperature rise of the NOx catalyst 3.

If an excessive adsorption state arises in the NOx catalyst 3, ammonia is released from the NOx catalyst 3 in accordance with the adsorption capacity and, as a result, ammonia in the exhaust gas flowing out from the NOx catalyst 3 temporarily increases. Due to this temporary increase in ammonia, the possibility of the NOx removal rate falling below the determination threshold arises and the NOx catalyst 3 that should be determined to be normal may erroneously be determined to have deteriorated (wrong deterioration determination). In such a case, it is preferable to refrain from calculating the NOx removal rate (calculation based on Formula 1) using the detection value of the NOx sensor 8.

In the present example, by contrast, the amount of ammonia released from the NOx catalyst 3 is estimated and based on the estimated value, the slip ammonia amount and the NOx converted ammonia amount are further estimated. Then, if at least one of the slip ammonia amount and the NOx converted ammonia amount or the total thereof exceeds a threshold, the calculation of the NOx removal rate using the detection value of the NOx sensor 8 is prohibited or the deterioration determination of an exhaust emission control device is prohibited.

Here, the aforementioned excessive adsorption state of the NOx catalyst 3 will be discussed in detail. FIG. 4 is a diagram schematically showing the adsorption amount of ammonia by the NOx catalyst 3, the adsorption state of which reaches point P3 from point P1 due to a rapid rise of the catalyst temperature. In FIG. 4, the displacement indicated by an upward arrow acts in a direction in which an excessive amount regarding the adsorption of ammonia is increased and conversely, the displacement indicated by a downward arrow acts in a direction in which an excessive amount regarding the adsorption of ammonia is decreased. Hereinafter, the adsorption amount of ammonia in excess of the equilibrium adsorption amount will be referred to as an "excessive adsorption amount".

An arrow X11 means an excessive adsorption amount (X1−X2) generated due to a rapid rise of the temperature of the NOx catalyst 3. The relationship between the temperature of the NOx catalyst 3 and the equilibrium adsorption amount is determined in advance by an experiment or a simulation and stored in the ECU 20. Then, according to the relationship, the equilibrium adsorption amount corresponding to the temperature of the NOx catalyst 3 can be calculated.

The adsorption amount of ammonia may change depending on the amount of NOx flowing into the NOx catalyst 3. Thus, the excessive adsorption amount may be calculated in consideration of the temperature of the NOx catalyst 3 and the amount of NOx flowing into the NOx catalyst 3.

Then, regarding the excessive adsorption amount of the NOx catalyst 3, it is preferable to consider, in addition to the arrow X11, the following three factors. By considering these factors, the excessive adsorption amount can be grasped more correctly.

(1) Adsorption Amount of Ammonia Resulting from the Supply of Urea Water by the Supply Valve 5

The amount of urea water supplied from the supply valve 5 may be increased or decreased regardless of the state of the NOx catalyst 3. For example, in an operating state considered to lead to a too high temperature of the supply valve 5, more urea water than the amount of urea water needed for NOx removal is supplied from the supply valve 5 to lower the temperature of the supply valve 5. That is, by causing the supply valve 5 to circulate more urea water, an attempt is made to lower the temperature of the supply valve 5. In such a case, the amount of ammonia flowing into the NOx catalyst 3 increases.

Then, excessive ammonia acts in a direction to expand the excessive adsorption amount by being adsorbed by the carrier of the NOx catalyst 3. Thus, an adsorption amount $\Delta N1$ of ammonia due to the supply of urea water by the supply valve 5 is represented by an arrow X12 in FIG. 4 and the magnitude thereof is represented by the formula below:

$$\Delta N1 = \text{ammonia generation amount by supplied urea water} - \text{standard ammonia generation amount.} \quad \text{(Formula 3)}$$

Regarding the "ammonia generation amount by supplied urea water", data on the relationship between the amount of supplied urea water and the exhaust gas temperature is acquired in advance by an experiment or the like, and the data is stored in a memory of the ECU 20 as a control map. Then, by accessing the control map as the need arises, the amount of ammonia supplied to the NOx catalyst 3 can be calculated based on the amount of urea water supplied by the supply valve 5 and the exhaust gas temperature. The "standard ammonia generation amount" is the amount of ammonia that can be used for a reduction reaction and may be determined in advance by an experiment or the like.

A case when the supply amount of urea water is decreased for some reason can also be considered. In this case, the arrow X12 in FIG. 4 points downward, which acts in a direction to reduce the excessive amount regarding the adsorption of ammonia.

(2) Amount of Increase of Ammonia Consumption in a Non-Equilibrium State

As described above, the adsorption state of the NOx catalyst shown in point P3 can be said to be a state deviating from the equilibrium state, that is, a non-equilibrium state. If the adsorption state of the NOx catalyst 3 leads to a non-equilibrium state due to a temperature rise of the NOx catalyst 3, the amount of ammonia adsorbed by the NOx catalyst 3 increases and therefore, compared with a case of the equilibrium state at the same catalyst temperature, a reaction of NOx and ammonia is considered to be promoted, leading to an increasing consumption of ammonia. The increased consumption of ammonia acts in a direction to reduce the excessive adsorption amount. The increased consumption $\Delta N2$ of ammonia is represented by an arrow X13 in FIG. 4.

Regarding the increased consumption $\Delta N2$ of ammonia, the adsorption amount of ammonia, the temperature of the NOx catalyst 3, and the flow rate of exhaust gas (may also be the amount of intake air) are used as parameters, these parameters and the increased amount of the NOx removal rate are associated to build a control map through an experiment or the like in advance, and the control map is stored in the memory of the ECU 20. Then, by accessing the control map as the need arises, the increased consumption $\Delta N2$ of ammonia can be calculated from the increased amount of the NOx removal rate in the NOx catalyst 3 in a non-equilibrium state at that time and the amount of NOx in the exhaust gas flowing into the NOx catalyst 3.

When the NOx catalyst 3 is normal, the NOx removal rate in an equilibrium state is substantially 100%. In an excessive adsorption state in which the NOx removal rate could become higher, the NOx removal rate is naturally substantially 100%. That is, regardless of the equilibrium state and the non-equilibrium state, the NOx removal rate hardly changes and thus, the increased consumption $\Delta N2$ of ammonia is considered to be extremely small. Therefore, the value of the increased consumption $\Delta N2$ of ammonia may fixedly be set to 0.

(3) Release Amount of Ammonia from the NOx Catalyst 3

In an excessive adsorption state of the NOx catalyst 3, ammonia may be released from the NOx catalyst 3. However, even in an excessive adsorption state, all ammonia adsorbed excessively will not be released all at once. That is, the excessive adsorption amount decreases gradually. Then, the release amount of ammonia acts in a direction to reduce the excessive adsorption amount. The release amount $\Delta N3$ of ammonia is represented by an arrow X14 in FIG. 4.

The release amount $\Delta N3$ of ammonia can be calculated by, for example, the following formula using the excessive adsorption amount and the temperature of the NOx catalyst 3 as parameters:

$$\Delta N3 = k \times \text{excessive adsorption amount} \times \exp(-Ea/\text{NOx catalyst temperature}) \quad \text{(Formula 4)}$$

where k and Ea are constants obtained in advance from an experiment or a simulation.

Figure 5:
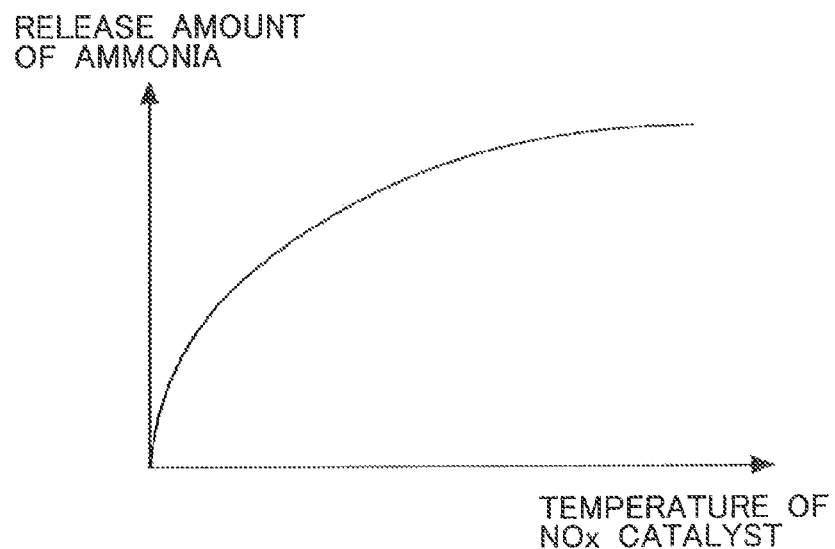
FIG. 5 is a diagram showing the relationship between the temperature of the NOx catalyst and a release amount of ammonia.

FIG. 5 is a diagram showing the relationship between the temperature of the NOx catalyst 3 and the release amount $\Delta N3$ of ammonia. Thus, the release amount $\Delta N3$ of ammonia depends on the temperature of the NOx catalyst 3 and the release amount $\Delta N3$ of ammonia increases with a rising temperature of the NOx catalyst 3, but an increasing rate of the release amount $\Delta N3$ of ammonia to a rising rate of the temperature of the NOx catalyst 3 decreases with a rising temperature of the NOx catalyst 3.

Then, the excessive adsorption amount in the NOx catalyst 3 can correctly be grasped by considering (1) to (3) described above for the excessive adsorption amount (X1-X2) resulting from a temperature rise. In the example of FIG. 4, an adsorption amount $\Delta X$ of ammonia obtained by subtracting the magnitude of the arrow X13 and the arrow X14 from the magnitude of the arrow X11 and the arrow X12 corresponds to the final excessive adsorption amount of the NOx catalyst 3. The final excessive adsorption amount $\Delta X$ of the NOx catalyst 3 is regarded as a value determined by considering an increase or decrease of the adsorption amount of ammonia in one cycle of the operation period.

Figure 6:
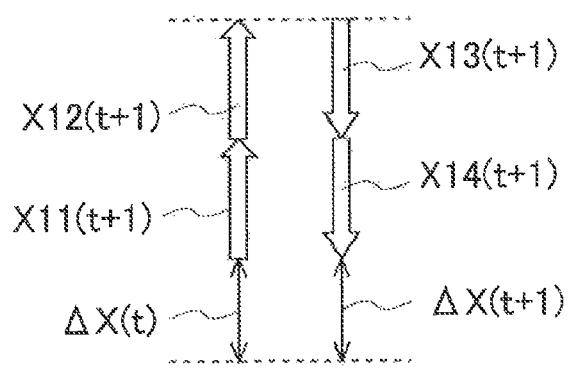
FIG. 6 is a diagram schematically showing the adsorption amount of ammonia by the NOx catalyst between the time (t) when the catalyst temperature rises rapidly and the time (t+1) one cycle thereafter in the operation period.
Figure 7:
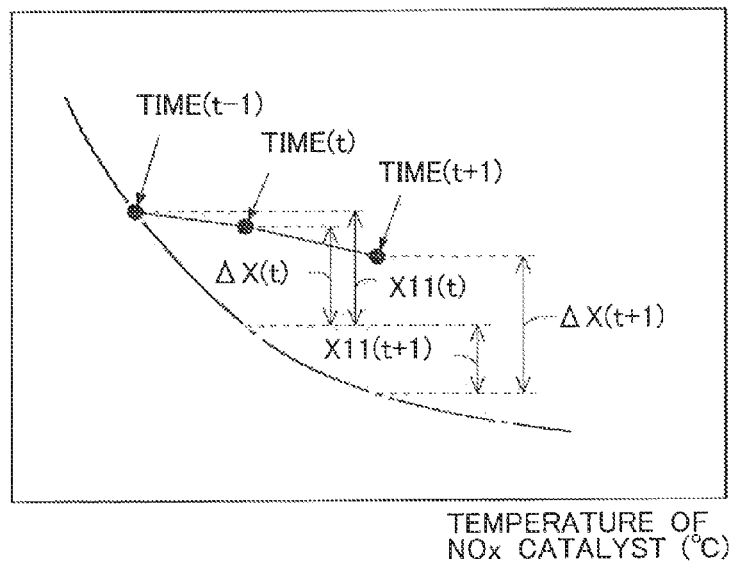
FIG. 7 is a diagram showing changes of the adsorption amount of ammonia when the catalyst temperature rises rapidly.

The release amount $\Delta N3$ of ammonia uses the excessive adsorption amount as a parameter and the excessive adsorption amount uses the release amount $\Delta N3$ of ammonia as a parameter. When the excessive adsorption amount is calculated, the excessive adsorption amount and the release amount $\Delta N3$ of ammonia can repeatedly be calculated by using the release amount $\Delta N3$ of ammonia calculated one cycle before in the operation period. Then, the new excessive adsorption amount $\Delta X$ is calculated by further adding the magnitude of excessive adsorption amount $\Delta X$ calculated one cycle before in the operation period to the total magnitude of the arrow X11 and the arrow X12 in the next cycle and subtracting the magnitude of the arrow X13 and the arrow X14 from the added value. FIG. 6 is a diagram schematically showing the adsorption amount of ammonia by the NOx catalyst 3 between the time (t) when the catalyst temperature rises rapidly and the time (t+1) one cycle thereafter in the operation period. FIG. 7 is a diagram showing changes of the adsorption amount of ammonia when the catalyst temperature rises rapidly. In FIGS. 6 and 7, (t−1) shows a value one cycle before in the operation period, (t) shows a value in the current cycle in the operation period, and (t+1) shows a value in the next cycle in the operation period. In FIG. 7, an alternate long and short dash line shows an equilibrium adsorption amount and a solid line shows an actual adsorption amount. An excessive adsorption amount $\Delta X$ (t) at time (t) can be calculated based on the relationship shown in FIG. 4 and an excessive adsorption amount $\Delta X$ (t+1) at time (t+1) can be calculated based on the relationship shown in FIG. 6. An excessive adsorption amount $\Delta X$ after time (t+1) can similarly be calculated based on the relationship shown in FIG. 6. In this manner, by considering the excessive adsorption amount $\Delta X$ calculated in the previous cycle, the excessive adsorption amount $\Delta X$ thereafter can repeatedly be calculated.

Incidentally, when the ASC catalyst 4 is provided downstream of the NOx catalyst 3, ammonia released from the NOx catalyst 3 may be purified by being oxidized by the ASC catalyst 4. On the other hand, ammonia that passes by without being oxidized by the ASC catalyst 4 or ammonia converted to NOx by the ASC catalyst 4 can also be present. The following reactions may be caused in the ASC catalyst 4 by ammonia flowing into the ASC catalyst 4.

$$4NH_3 + 3O_2 \rightarrow 2N_2 + 6H_2O \quad \text{(Formula 5)}$$

$$4NH_3 + 5O_2 \rightarrow 4NO + 6H_2O \quad \text{(Formula 6)}$$

$$4NH_3 + 4O_2 \rightarrow 2N_2O + 6H_2O \quad \text{(Formula 7)}$$

$$4NH_3 \rightarrow 4NH_3 \quad \text{(Formula 8)}$$

Formula 5 shown above is a reaction in which ammonia is converted to $N_2$. $N_2$ is not detected by the NOx sensor 8 and does not affect the NOx removal rate. Formula 6 shown above is a reaction in which ammonia is converted to NO. That is, Formula 6 is a reaction in which NO is generated due to NOx converted ammonia. NO is detected by the NOx sensor 8 and thus, if the reaction in Formula 6 occurs, the NOx removal rate falls. Formula 7 shown above is a reaction in which ammonia is converted to $N_2O$. $N_2O$ is not detected by the NOx sensor 8 and does not affect the NOx removal rate. Formula 8 shown above indicates that ammonia passes through the ASC catalyst 4 without reacting. Ammonia passing through the ASC catalyst 4 is slip ammonia. In the case of Formula 8 shown above, ammonia is detected by the NOx sensor 8 and thus, when ammonia passes through the ASC catalyst 4, the NOx removal rate falls. If the NOx removal rate is calculated based on the detection value of the NOx sensor 8, it could become difficult to correctly calculate the NOx removal rate in the NOx catalyst 3 when slip ammonia or NOx converted ammonia is present.

Thus, in the present example, the amount of ammonia released from the NOx catalyst 3 is estimated and based on the estimated value, the slip ammonia amount or the NOx converted ammonia amount is further estimated. The slip ammonia amount or the NOx converted ammonia amount is calculated based on the release amount of ammonia from the NOx catalyst 3. The method of calculating the release amount of ammonia is described above in (3). Hereinafter, the method of calculating the slip ammonia amount and the NOx converted ammonia amount based on the release amount of ammonia will be described.

Figure 8:
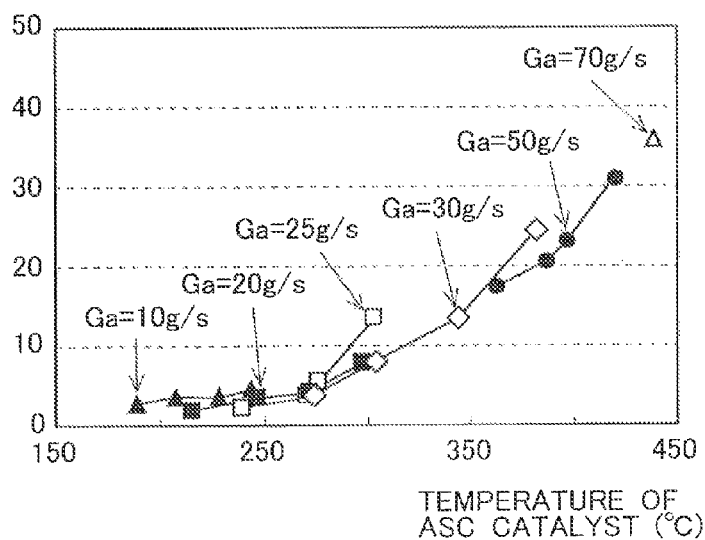
FIG. 8 is a diagram showing the relationship between the temperature of the ASC catalyst and an NOx conversion rate.

FIG. 8 is a diagram showing the relationship between the temperature of the ASC catalyst 4 and an NOx conversion rate. The NOx conversion rate is a ratio of the amount of ammonia converted to NOx to the amount of ammonia flowing into the ASC catalyst 4. The NOx conversion rate is related to the temperature of the ASC catalyst 4 and an amount of intake air Ga (may also be an exhaust gas flow rate). If the temperature of the ASC catalyst 4 and the amount of intake air Ga are determined, the NOx conversion rate can be determined according to the relationship in FIG. 8. The relationship in FIG. 8 is determined and mapped in advance by an experiment or the like and stored in the ECU 20. Then, by accessing the map, the NOx conversion rate corresponding to the temperature of the ASC catalyst 4 and the amount of intake air Ga can be calculated. Further, the NOx converted ammonia amount can be calculated by multiplying the amount of ammonia flowing into the ASC catalyst 4, that is, the release amount of ammonia from the NOx catalyst 3 by the NOx conversion rate.

Figure 9:
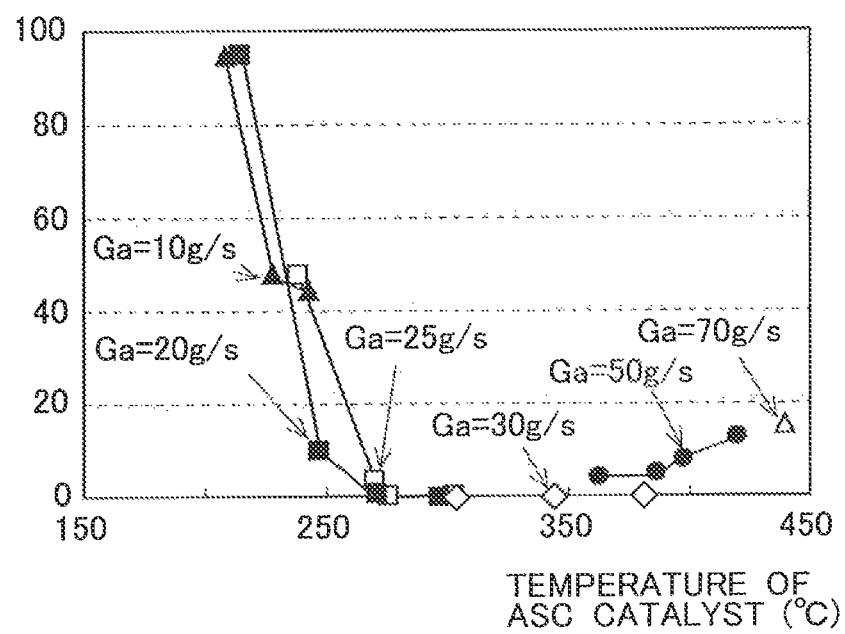
FIG. 9 is a diagram showing the relationship between the temperature of the ASC catalyst and an ammonia slip rate.

FIG. 9 is a diagram showing the relationship between the temperature of the ASC catalyst 4 and an ammonia slip rate. The ammonia slip rate is a ratio of the amount of ammonia passing through the ASC catalyst 4 to the amount of ammonia flowing into the ASC catalyst 4. The ammonia slip rate is related to the temperature of the ASC catalyst 4 and the amount of intake air Ga (may also be the exhaust gas flow rate). If the temperature of the ASC catalyst 4 and the amount of intake air Ga are determined, the ammonia slip rate can be determined according to the relationship in FIG. 9. The relationship in FIG. 9 is determined and mapped in advance by an experiment, a simulation or the like and stored in the memory of the ECU 20. Then, by accessing the map, the ammonia slip rate corresponding to the temperature of the ASC catalyst 4 and the amount of intake air Ga can be calculated. Then, the slip ammonia amount can be calculated by multiplying the amount of ammonia flowing into the ASC catalyst 4, that is, the release amount of ammonia from the NOx catalyst 3 by the ammonia slip rate.

Figure 10:
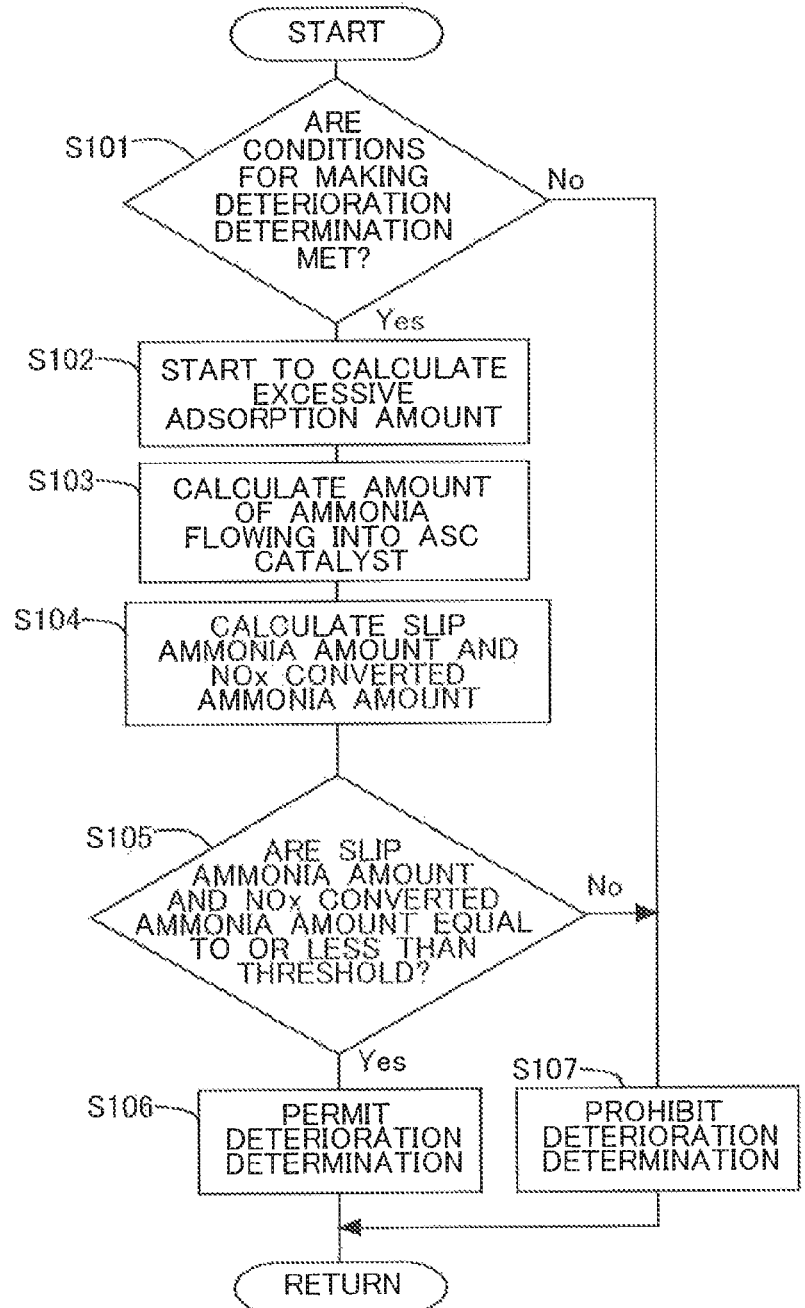
FIG. 10 is a flow chart showing the flow of a deterioration determination of an exhaust emission control device according to Example 1.

Based on the above, the ECU 20 makes a deterioration determination of an exhaust emission control device. FIG. 10 is a flow chart showing the flow of a deterioration determination of an exhaust emission control device according to the present example. The control is exercised by the ECU 20 at predetermined intervals.

In step S101, whether conditions for making a deterioration determination are met is determined. Conditions for a deterioration determination are, for example, whether the temperatures of the NOx catalyst 3 and the ASC catalyst 4 exceed an activating temperature or whether the temperatures of the NOx sensors 7, 8 have risen to a temperature at which NOx can be detected. The temperatures of the NOx catalyst 3 and the ASC catalyst 4 can be estimated based on the detection value of the temperature sensor 9 and the temperatures of the NOx sensors 7, 8 can be estimated based on an elapsed time after the internal combustion engine 1 starts to warm up. The completion of warming-up of the internal combustion engine 1 may be set as one of conditions. If an affirmative determination is made in step S101, the process proceeds to step S102. On the other hand, if a negative determination is made in step S101, the process proceeds to step S107 to prohibit a deterioration determination of the exhaust emission control device.

In step S102, the calculation of an excessive adsorption amount is started.

In step S103, the amount of ammonia flowing into the ASC catalyst 4 is calculated. The amount of ammonia flowing into the ASC catalyst 4 is equal to the amount of ammonia released from the NOx catalyst 3. That is, as described above, the release amount of ammonia from the NOx catalyst 3 is calculated. In the present example, the ECU 20 processing step S103 corresponds to an inflow amount calculation unit in the present invention.

In step S104, the ammonia slip amount and the NOx converted ammonia amount are calculated. That is, the NOx converted ammonia amount is calculated by determining the NOx conversion rate according to the relationship in FIG. 8 and multiplying the amount of ammonia flowing into the ASC catalyst 4 calculated in step S103 by the NOx conversion rate. Also, the ammonia slip amount is calculated by determining the ammonia slip rate according to the relationship in FIG. 9 and multiplying the amount of ammonia flowing into the ASC catalyst 4 calculated in step S103 by the ammonia slip rate. In the present example, the ECU 20 processing step S104 corresponds to an outflow amount calculation unit in the present invention.

In step S105, whether the total value of the slip ammonia amount and the NOx converted ammonia amount is equal to or less than a threshold. The threshold is determined in advance as a total value capable of making a deterioration determination with desired determination accuracy by an experiment, a simulation or the like and stored in the ECU 20. Incidentally, one of the values of the slip ammonia amount and the NOx converted ammonia amount may be compared with the threshold. Alternatively, the slip ammonia amount and the NOx converted ammonia amount may be each compared with the respective thresholds.

If an affirmative determination is made in step S105, the process proceeds to step S106 to permit a deterioration determination of the exhaust emission control device. On the other hand, if a negative determination is made in step S105, the process proceeds to step S107 to prohibit the deterioration determination of the exhaust emission control device. In the present example, the ECU 20 processing step S105 and step S107 corresponds to a deterioration determination limiting unit in the present invention. In step S107, instead of prohibiting the deterioration determination itself, the use of the detection value of the NOx sensor 8 may be limited. Limiting the use of the detection value of the NOx sensor 8 includes making a deterioration determination without using the detection value of the NOx sensor 8 and lowering the degree of influence of the detection value on the deterioration determination even if the detection value of the NOx sensor 8 is used.

Then, if the deterioration determination of the exhaust emission control device is permitted in step S106, the deterioration determination of the exhaust emission control device is made. The deterioration determination of the exhaust emission control device is made by, for example, determining whether the NOx removal rate calculated from detection values of the NOx sensors 7, 8 is equal to or more than a determination threshold. That is, if the NOx removal rate is equal to or more than the determination threshold, the exhaust emission control device is determined to be normal and if the NOx removal rate is less than the determination threshold, the exhaust emission control device is determined to have deteriorated. The determination threshold is preset as an NOx removal rate when the exhaust emission control device is considered to be normal.

Figure 11:
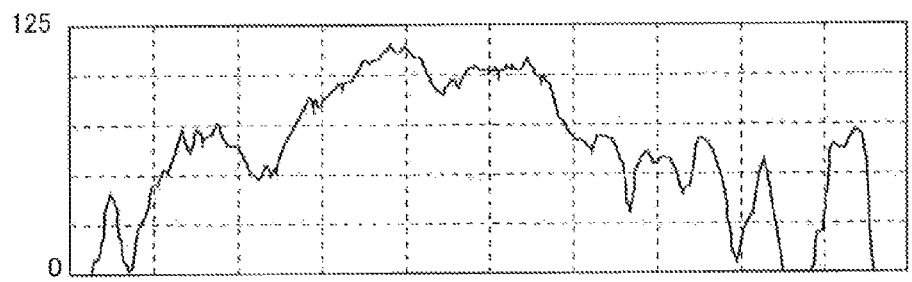
FIG. 11 is a time chart illustrating changes (experiment example) of each parameter concerning the internal combustion engine when the control shown in FIG. 10 is exercised.
Figure 11:
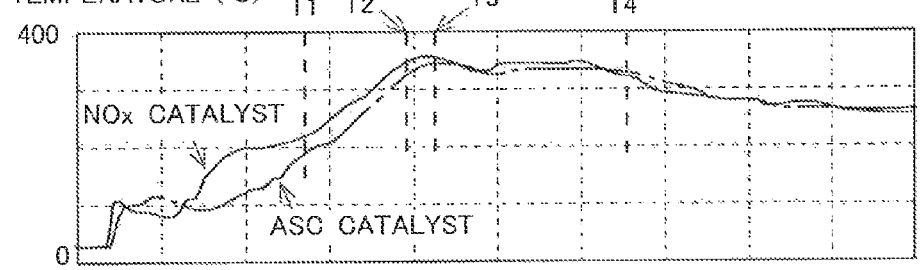
Figure 11:
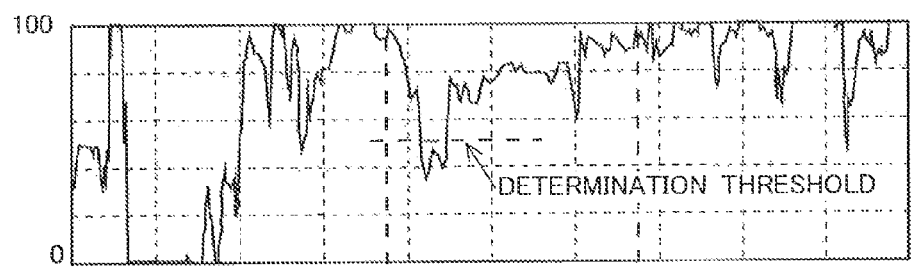
Figure 11:
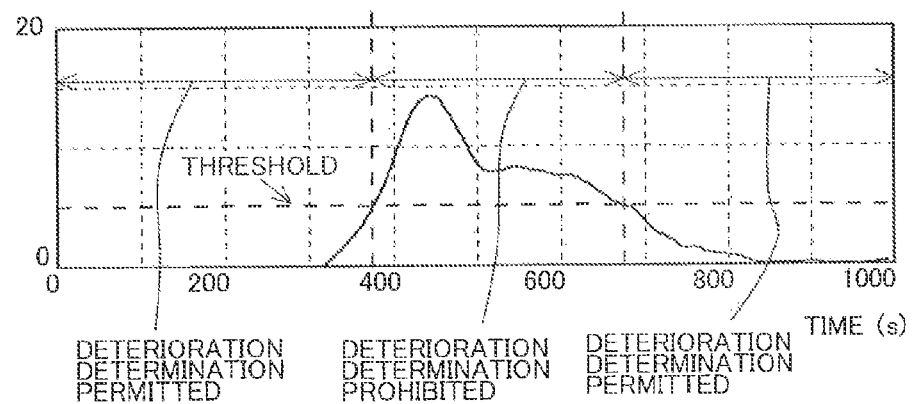

FIG. 11 is a time chart illustrating changes (experiment example) of each parameter concerning the internal combustion engine 1 when the control shown in FIG. 10 is exercised. In the experiment, the NOx catalyst 3 and the ASC catalyst 4 in a normal state are used. In FIG. 11, "Vehicle speed" is the speed of the vehicle on which the internal combustion engine 1 is mounted, "Temperature" is the temperature (solid line) of the NOx catalyst 3 and the temperature (alternate long and short dash line) of the ASC catalyst 4, "NOx removal rate" is the NOx removal rate calculated by using detection values of the NOx sensors 7, 8, and "NOx converted $NH_3$+slip $NH_3$" is the total value of the NOx converted ammonia amount and the slip ammonia amount. The threshold of "NOx converted $NH_3$+slip $NH_3$" is the threshold in step S105 in FIG. 10. The horizontal axis of each chart in FIG. 11 is the time and changes of each parameter in a common time range are illustrated.

In a period between T1 and T2 in FIG. 11, the temperatures of the NOx catalyst 3 and the ASC catalyst 4 rise rapidly with an increasing vehicle speed. In the period between T1 and T2, the actual adsorption amount is larger than the equilibrium adsorption amount, leading to an excessive adsorption state. Then, ammonia released from the NOx catalyst 3 flows into the ASC catalyst 4 and a portion of the ammonia is converted to NOx or flows out from the ASC catalyst 4 unchanged as ammonia. Accordingly, the NOx removal rate falls in the period between T3 and T4 and falls below the determination threshold in a portion of the period.

On the other hand, in the period between T5 and T6 in which the slip ammonia amount and the NOx converted ammonia amount exceed the threshold, the deterioration determination of the exhaust emission control device is prohibited. That is, the deterioration determination is prohibited in a period in which the NOx removal rate could fall below the determination threshold. When the deterioration determination using detection values of the NOx sensors 7, 8 is prohibited, a deterioration determination by other means may instead be made.

According to the present example, as described above, when the accuracy of deterioration determination of an exhaust emission control device decreases due to slip ammonia or NOx converted ammonia, the deterioration determination is prohibited or the use of detection values of the NOx sensors 7, 8 is prohibited and therefore, it is possible to prevent the NOx catalyst 3 from being determined to have deteriorated in spite of its normal operation.

In addition, the period in which the accuracy of deterioration determination of an exhaust emission control device decreases can correctly be predicted and therefore, the period in which the deterioration determination is prohibited or the period in which the use of detection values of the NOx sensors 7, 8 is prohibited can be minimized. Accordingly, the frequency of deterioration determination can be increased.

Further, the slip ammonia amount can be reduced by using the estimated slip ammonia amount for control such as the supply of ammonia. Also, by using the estimated slip ammonia amount for control to suppress the fall of the NOx removal rate, the fall of the NOx removal rate can be suppressed.

Example 2

In the present example, the determination threshold is changed based on the slip ammonia amount and the NOx converted ammonia amount. Other devices and the like are the same as in Example 1 and the description thereof is omitted.

The amount of fall of the NOx removal rate due to slip ammonia and NOx converted ammonia can be estimated based on Formula 2 shown above. By changing the determination threshold based on the amount of fall, the accuracy of deterioration determination can be improved.

Figure 12:
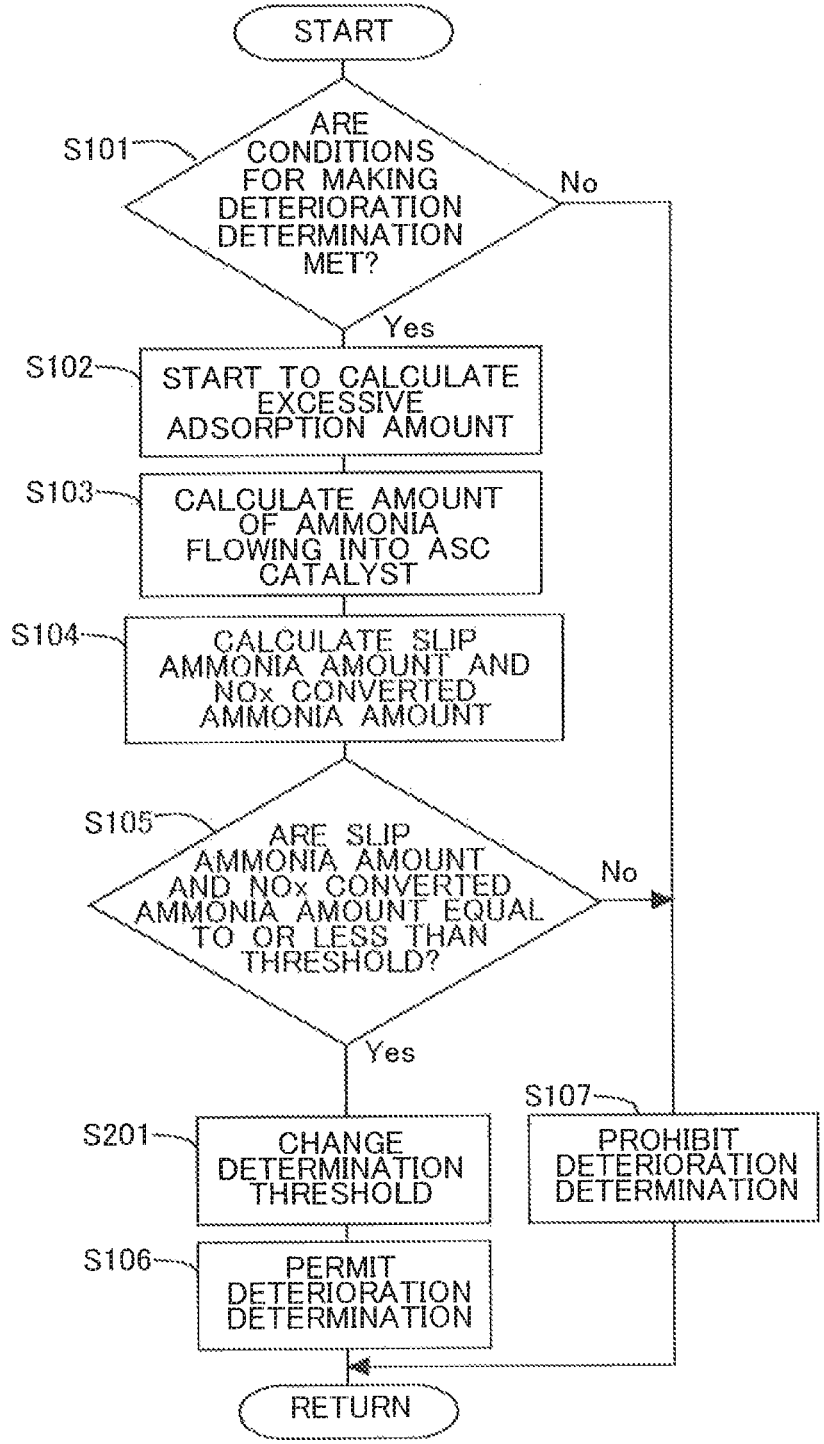
FIG. 12 is a flowchart showing the flow of the deterioration determination of the exhaust emission control device according to Example 2.

FIG. 12 is a flowchart showing the flow of the deterioration determination of the exhaust emission control device according to the present example. The control is exercised by the ECU 20 at predetermined intervals. The same symbols are attached to steps in which the same process is performed as in the flow shown in FIG. 10 and the description thereof is omitted.

In the flow shown in FIG. 12, if an affirmative determination is made in step S105, the process proceeds to step S201. Then, in step S201, the determination threshold is changed based on the slip ammonia amount and the NOx converted ammonia amount calculated in step S104. The amount of change of the determination threshold may be set to the amount of fall of the NOx removal rate obtained from Formula 2 shown above. Also, the relationship between the slip ammonia amount and NOx converted ammonia amount and the amount of change of the determination threshold may be determined in advance by an experiment or the like and stored in the ECU 20.

Thus, even if the NOx removal rate falls due to slip ammonia and NOx converted ammonia, it is possible to prevent the NOx catalyst 3 from being determined to have deteriorated in spite of its normal operation, by changing the determination threshold based on the slip ammonia amount and the NOx converted ammonia amount.

Example 3

In the above examples, a determination based on the total value of the slip ammonia amount and the NOx converted ammonia amount is made, but in the present example, a deterioration determination based on one of the slip ammonia amount and the NOx converted ammonia amount is made. Other devices and the like are the same as in Example 1 and the description thereof is omitted.

First, a case in which whether to prohibit a deterioration determination or whether to prohibit the use of detection values of the NOx sensors 7, 8 is determined based on only the slip ammonia amount will be considered. When a deterioration determination is made based on only the NOx converted ammonia amount, slip ammonia in the description below may be replaced by NOx converted ammonia.

If only a portion of fall of the NOx removal rate caused by slip ammonia is considered, the NOx removal rate can still be caused to fall by the NOx converted ammonia. Therefore, if a deterioration determination is made by considering that no NOx converted ammonia is present, the accuracy of deterioration determination could decrease. Thus, in the present example, it is assumed that the NOx converted ammonia amount takes the maximum possible value. That is, the NOx converted ammonia amount at which the NOx removal rate could fall most.

It is assumed here that the deterioration determination of an exhaust emission control device is made when, for example, the temperature of the ASC catalyst 4 is between 200° C. and 400° C. If the deterioration determination of the NOx catalyst 3 is made when the temperature of the ASC catalyst 4 is between, for example, 200° C. and 400° C., the NOx conversion rate shown in FIG. 8 is the highest when the temperature of the ASC catalyst 4 is 400° C. Therefore, the NOx converted ammonia amount may be calculated by using the NOx conversion rate when the temperature of the ASC catalyst 4 is 400° C. On the other hand, the slip ammonia amount is calculated, like in Example 1, based on the actual temperature of the ASC catalyst 4 and the amount of intake air. Therefore, the process for deterioration determination of the NOx catalyst 3 can be simplified by determining the NOx converted ammonia amount in a simplified manner.

When the deterioration determination of an exhaust emission control device is made, the NOx converted ammonia amount may be calculated as described above in step S104 in FIGS. 10 and 12.

Also, by using the ASC catalyst 4 that prevents slip ammonia and NOx converted ammonia from arising simultaneously, only one of the slip ammonia amount and the NOx converted ammonia amount may be calculated. That is, by using the ASC catalyst 4 in which the temperature and the amount of intake air of the ASC catalyst 4 at which slip ammonia is generated and the temperature and the amount of intake air of the ASC catalyst 4 at which NOx converted ammonia is generated do not overlap, slip ammonia and NOx converted ammonia do not arise simultaneously. Accordingly, only one of slip ammonia and NOx converted ammonia needs to be considered in accordance with the temperature and the amount of intake air of the ASC catalyst 4.

Also, by making the deterioration determination of the NOx catalyst 3 at a temperature at which only one of slip ammonia and NOx converted ammonia arises, only one of the slip ammonia amount and the NOx converted ammonia amount may be calculated.

In these cases, only one of the slip ammonia amount and the NOx converted ammonia amount is calculated and the other may be considered to be 0 in Example 1 or 2. That is, one of the slip ammonia amount and the NOx converted ammonia amount calculated in step S104 in FIGS. 10 and 12 may be set to 0.

According to the present example, as described above, the deterioration determination of the NOx catalyst 3 can be made by calculating only one of the slip ammonia amount and the NOx converted ammonia amount and therefore, the process can be simplified.

EXPLANATION OF REFERENCE NUMERALS AND CHARACTERS

1 Internal combustion engine
2 Exhaust path
3 Selective reduction type NOx catalyst
4 Oxidation catalyst
5 Supply valve
6 Urea tank
7 NOx sensor
8 NOx sensor
9 Temperature sensor
11 Crank position sensor
12 Accelerator opening sensor
15 Intake path
16 Air flow meter
20 ECU

The invention claimed is:

1. A deterioration determination system of an exhaust emission control device including:
   a selective reduction type NOx catalyst provided in an exhaust path of an internal combustion engine and using ammonia as a reducing agent;
   a reducing agent supply unit that supplies ammonia or a precursor of the ammonia into an exhaust gas flowing into the selective reduction type NOx catalyst upstream of the selective reduction type NOx catalyst;
   a catalyst provided downstream of the selective reduction type NOx catalyst and having an oxidative capacity;
   an NOx sensor provided downstream of the catalyst having the oxidative capacity to detect NOx in the exhaust gas flowing out from the catalyst having the oxidative capacity and also to detect the ammonia in the exhaust gas as NOx; and
   a deterioration determination unit that makes a deterioration determination of the selective reduction type NOx catalyst based on a detection value of the NOx sensor,
   the deterioration determination system comprising:
   an outflow amount calculation unit that calculates, when an amount of the ammonia adsorbed by the selective reduction type NOx catalyst is larger than an equilibrium adsorption amount which is an adsorption amount of the ammonia when adsorption and release of the ammonia by and from the selective reduction type NOx catalyst are in an equilibrium state, out of the amount of the ammonia flowing into the catalyst having the oxidative capacity, at least one of the amount of the ammonia flowing out from the catalyst having the oxidative capacity and the amount of the ammonia converted to NOx in the catalyst having the oxidative capacity or a total value of both; and
   a deterioration determination limiting unit that, when the value calculated by the outflow amount calculation unit exceeds a threshold, limits use of the detection value of the NOx sensor in the deterioration determination by the deterioration determination unit, or prohibits the deterioration determination itself by the deterioration determination unit.

2. The deterioration determination system of an exhaust emission control device according to claim 1, wherein the outflow amount calculation unit calculates, out of the amount of the ammonia flowing into the catalyst having the oxidative capacity, at least one of the amount of the ammonia flowing out from the catalyst having the oxidative capacity and the amount of the ammonia converted to NOx in the catalyst having the oxidative capacity or a total value of both, based on a temperature of the catalyst having the oxidative capacity and an amount of intake air of the internal combustion engine.

3. The deterioration determination system of an exhaust emission control device according to claim 1, wherein the deterioration determination unit:
   makes the deterioration determination by comparing an NOx removal rate of the selective reduction type NOx catalyst calculated based on the detection value of the NOx sensor and an amount of NOx in the exhaust gas flowing into the selective reduction type NOx catalyst with a determination threshold serving as a threshold to determine deterioration of the selective reduction type NOx catalyst; and
   changes the determination threshold based on a calculated value by the outflow amount calculation unit when the value calculated by the outflow amount calculation unit is equal to or less than a threshold.

4. The deterioration determination system of an exhaust emission control device according to claim 1, further comprising an inflow amount calculation unit that calculates, when the equilibrium adsorption amount decreases with a rising temperature of the selective reduction type NOx catalyst, the amount of the ammonia flowing into the catalyst having the oxidative capacity, based on at least an excessive adsorption amount which is a difference between an actual adsorption amount of the ammonia by the selective reduction type NOx catalyst and the equilibrium adsorption amount.

5. The deterioration determination system of an exhaust emission control device according to claim 4, wherein
   the inflow amount calculation unit further calculates the excessive adsorption amount based on at least one of:
   the amount of the ammonia excessively adsorbed by the selective reduction type NOx catalyst caused by an excessive reducing agent of the reducing agent supplied from the reducing agent supply unit;
   the amount of the ammonia consumed more than that in the equilibrium state for NOx reduction by the selective reduction type NOx catalyst resulting from adsorption of ammonia in an amount greater than the equilibrium adsorption amount by the selective reduction type NOx catalyst; and
   the value calculated by the inflow amount calculation unit.

* * * * *